(12) United States Patent
Steeves (10) Patent No.: US 8,145,914 B2
(45) Date of Patent: Mar. 27, 2012

(54) CLIENT-SIDE CAPTCHA CEREMONY FOR USER VERIFICATION

(75) Inventor: David J. Steeves, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1116 days.

(21) Appl. No.: 11/303,441

(22) Filed: Dec. 15, 2005

(65) Prior Publication Data

US 2007/0143624 A1    Jun. 21, 2007

(51) Int. Cl.
 H04L 29/06  (2006.01)
(52) U.S. Cl. ...................................................... 713/184
(58) Field of Classification Search .................. 709/225, 709/228, 203; 713/155, 184
See application file for complete search history.

(56) References Cited

U.S. PATENT DOCUMENTS

| | | | |
|---|---|---|---|
| 5,715,314 A | 2/1998 | Payne et al. | |
| 6,012,039 A | 1/2000 | Hoffman et al. | |
| 6,195,698 B1 * | 2/2001 | Lillibridge et al. | 709/225 |
| 6,226,752 B1 * | 5/2001 | Gupta et al. | 726/9 |
| 6,678,821 B1 * | 1/2004 | Waugh et al. | 713/168 |
| 6,760,841 B1 | 7/2004 | Fernandez | |
| 7,006,661 B2 | 2/2006 | Miller | |
| 7,080,037 B2 * | 7/2006 | Burger et al. | 705/50 |
| 2001/0000265 A1 * | 4/2001 | Schreiber et al. | 713/201 |
| 2002/0010515 A1 | 1/2002 | Fukuoka et al. | |
| 2002/0044650 A1 | 4/2002 | Shen | |
| 2002/0065065 A1 | 5/2002 | Lunsford et al. | |
| 2002/0095389 A1 | 7/2002 | Gaines | |
| 2002/0107791 A1 | 8/2002 | Nobrega et al. | |
| 2003/0005464 A1 | 1/2003 | Gropper et al. | |
| 2003/0110400 A1 | 6/2003 | Cartmell et al. | |
| 2003/0115142 A1 | 6/2003 | Brickell et al. | |
| 2003/0172283 A1 | 9/2003 | O'Hara | |
| 2004/0049515 A1 | 3/2004 | Haff et al. | |
| 2004/0199763 A1 * | 10/2004 | Freund | 713/154 |
| 2005/0065802 A1 | 3/2005 | Rui et al. | |
| 2005/0203843 A1 | 9/2005 | Wood et al. | |
| 2005/0246193 A1 | 11/2005 | Roever et al. | |
| 2006/0047766 A1 | 3/2006 | Spadea | |
| 2006/0229998 A1 | 10/2006 | Harrison et al. | |
| 2007/0005500 A1 | 1/2007 | Steeves et al. | |
| 2007/0028109 A1 | 2/2007 | Wysocki et al. | |
| 2009/0249477 A1 * | 10/2009 | Punera | 726/18 |

FOREIGN PATENT DOCUMENTS

JP    411085548    3/1999

OTHER PUBLICATIONS

U.S. Appl. No. 11/157,336, filed Jul. 20, 2005, Steeves et al.
U.S. Appl. No. 11/177,231, filed Jul. 8, 2005, Steeves.
U.S. Appl. No. 11/254,497, filed Oct. 20, 2005, Steeves.
U.S. Appl. No. 11/264,369, filed Nov. 1, 2005, Ellison.

* cited by examiner

*Primary Examiner* — Edward Zee
*Assistant Examiner* — John B King
(74) *Attorney, Agent, or Firm* — Perkins Coie LLP (57) ABSTRACT

A facility for performing a local human verification ceremony to obtain user verification is provided. Upon determining that user verification is needed to perform an action on a computer system, the facility presents a CAPTCHA challenge requesting verification that the user wants the action performed on the computer system. Upon receiving a response, the facility compares the received response to an expected correct response. If the received response is the correct response, the facility authorizes the action to be performed.

17 Claims, 6 Drawing Sheets

CLIENT-SIDE CAPTCHA CEREMONY FOR USER VERIFICATION

BACKGROUND

As dependence on computer systems and computer networks increases along with the sophistication and the frequency of attacks on computer systems and computer networks, the subject of computer security is becoming ever more prominent in the industry. Computer security techniques are presently used to protect users of the computer systems and the application programs and operating systems from malicious software ("malware")—e.g., viruses, worms, and Trojans—designed specifically damage or disrupt a computer system, and other undesirable activity.

Challenge/response is a widely used computer security technique. A common form of challenge/response in computer security is to query the user (e.g., the person) who is using the computer system to verify an action or actions in a dialog box. For example, a dialog box may ask the user to verify an action, such as, install an application on the computer system, stop the firewall or antivirus protection, flush a security policy, etc., that is going to be performed on the computer system. In many instances, the user is just requested to hit either an "OK" button or a "CANCEL" button that is provided in the dialog box. A problem with this type of challenge/response technique is that malware that is currently running on the computer system can hit the "OK" button in the dialog box.

Another common form of challenge/response in computer security is to ask the user who is using the computer system to provide authentication information (e.g., username and password). Once a user has successfully logged on to a computer system by providing the proper credentials to an operating system executing on the computer system, there should not be a need for the operating system to constantly re-authenticate the user. If the operating system needs the user's verification to perform an action, there is no need to put the user's password at risk. Yet, many scenarios that just need to know that the user wishes to perform an action, ask the user to provide proper credentials, such as a password. Challenging the user for a password or other credentials is overused in scenarios where the attempt is to verify that the user wants to perform the action (i.e., achieve a ceremony) and not authentication. If users are in the habit of repeatedly entering their password or credentials, the users begin entering it almost unconsciously. A disadvantage with challenging the user to provide proper credentials is that hackers can simulate the appearance of legitimate challenge/response windows. For example, malware executing on a computer system can present the user a window that is similar, if not identical, in appearance to a legitimate "Enter Password" window. Then, when the user provides the password, the user is unknowingly giving the hacker his or her password in plain text.

SUMMARY

A facility for performing a local human verification ceremony to obtain user verification is provided. Upon determining that user verification is needed to perform an action on a computer system, the facility presents a CAPTCHA challenge requesting verification that the user wants the action performed on the computer system. For example, the CAPTCHA challenge may display an image of distorted text and request that the user respond by providing the text that is in the displayed image to the facility. Upon receiving a response, the facility compares the received response to an expected correct response. If the received response is the correct response, the facility authorizes the action to be performed. Otherwise, if the received response is not the correct response, the facility does not authorize the action to be performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A software facility for performing a local human verification ceremony to obtain user verification ("the facility") is provided. Generally, the term "ceremony" refers to messages among computers, people, and possibly the environment, and a local human verification ceremony is performed to obtain verification or confirmation from a user that the user wants to perform a local action on the user's computer system. In some embodiments, the facility provides an interface through which a process, such as, by way of example and not limitation, an operating system, a client application, a software application, etc., which is executing on the computer system can request a local human verification ceremony. This allows the facility to be incorporated into one or more processes that may be executing on the computer system. When the facility determines that a local human verification ceremony needs to be performed, such as when requested by a process executing on the computer system to obtain user verification to perform an action (referred to as a "local override"), the facility creates a Completely Automated Public Turing Test to Tell Computers and Humans Apart ("CAPTCHA") challenge requesting confirmation from the user that the user wants to perform the action. For example, an operating system may invoke the facility to perform a local human verification ceremony to obtain user verification to perform an action on the computer system, such as alter a security configuration (e.g., change a password, flush a policy, etc.), alter a system configuration, alter driver settings, install a driver, alter computer system protection settings, such as antivirus protection settings, firewall settings, etc., and the like. Similarly, software applications may invoke the facility to perform a local human verification ceremony to obtain user verification to perform an action on the computer system. For example, a web browser application may invoke the facility to ask the user to verify their actions, such as installing an ActiveX control, a Java Script, etc.

In some embodiments, the CAPTCHA challenge describes the action for which user verification is being sought, displays an image of distorted text (e.g., one or more alpha-numeric characters), and requests that the user enter, for example, by typing, the text in the distorted image in a response input-text-box if the user wants to perform the described action. If the user wants to perform the described action, the user can enter the text in the distorted image in the provided response input-text-box. The user will be able to discern the text that is distorted, but non-humans, such as software processes, including malware, likely will not. Upon receiving a response to the CAPTCHA challenge, the facility compares the text that was entered by the user and the text that was displayed in the distorted image. If the text provided by the user matches the text that was displayed in the distorted image, the facility provides authorization to perform the action. For example, the facility may return a success response to the calling process, which informs the process that user verification was successfully obtained to perform the action.

In some embodiments, the facility requires the user to provide the correct response to the local human verification ceremony within a predetermined timeout (i.e., predetermined length of time). If the facility does not receive the correct response from the user before the timeout, the facility does not provide authorization to perform the action.

In some embodiments, the facility presents the CAPTCHA challenge in a digital rights management (DRM) protected window. DRM systems restrict the use of digital content in order to protect the interests of the content providers. DRM technologies can control access to the digital content, as well as the ability to alter, share, print, copy, save, play, view, etc., the digital content. Access rights associated with the digital content may specify the permitted relationship between users and DRM protected digital content (e.g., which content the users can access, what actions the users are permitted to perform (e.g., viewing, printing, copying, etc.)). DRM technologies may be contained within the operating system, software applications or programs, firmware, or the actual hardware. For example, a DRM application—i.e., an application that supports the DRM technology—may provide the ability to protect digital content by specifying access rights for the digital content. The DRM application may allow for displaying the protected digital content in a DRM protected window. The DRM protected window provides a secure environment by subjecting the displayed digital content to the restrictions implied by the access rights specified for the digital content. For example, using the DRM application, the facility can set the access rights for the CAPTCHA challenge to "view only" for all users. The facility can then request the DRM application to display the CAPTCHA challenge in a DRM protected window. When set to view only, the CAPTCHA challenge is visible only within the DRM protected window. The CAPTCHA challenge is not visible outside of the DRM protected window. Stated another way, the digital content (e.g., the CAPTCHA challenge) that is set to view only access rights becomes blank outside of the DRM protected window and, therefore, cannot be copied, printed, forwarded, pasted, played, etc.

By combining the CAPTCHA challenge with the DRM technology, the facility provides heightened protection for the local human verification ceremony. First, the CAPTCHA challenge makes it difficult for malware to correctly respond to the challenge. While the CAPTCHA challenge makes it difficult for malware to correctly respond to the challenge, an attacker can gain complete control of the computer system, obtain the contents of the CAPTCHA text, view it themselves, and respond to the challenge. For example, an attacker can ship off a screen shot of the CAPTCHA challenge to a web server, and ask innocent users the same challenge (e.g., for free access to the site, answer the challenge), then ship the answer back to the malware that is running on the computer system. The DRM technology provides additional protection by preventing screen scraping attacks. Because the challenge is blank and not visible outside of the CRM protected window, an attacker is not able to obtain a screen shot of the challenge.

In some embodiments, the facility displays a CAPTCHA challenge that displays an image of plain text in a DRM protected window. For example, the CAPTCHA challenge describes the action for which user verification is being sought, displays an image of an alpha-numeric string in plain text, and requests that the user enter the displayed alpha-numeric string in a response input-text-box if the user wants to perform the described action. The alpha-numeric string can be a string of one or more text characters, numeric characters, or a combination of text and numeric characters. If the user wants to perform the described action, the user can enter the displayed alpha-numeric string in the provided response input-text-box.

In some embodiments, the facility presents a CAPTCHA challenge that is an audio challenge. For example, the audio challenge may request that the user provide a response to a question. The user may respond by providing an answer in a response input-text-box. In some embodiments, the audio CAPTCHA challenge may request that the user provide a verbal response to the posed question. In still other embodiments, the audio challenge may be DRM protected; The DRM protected audio challenge exists only within an audio application that is capable of playing the DRM protected audio challenge.

Figure 1:
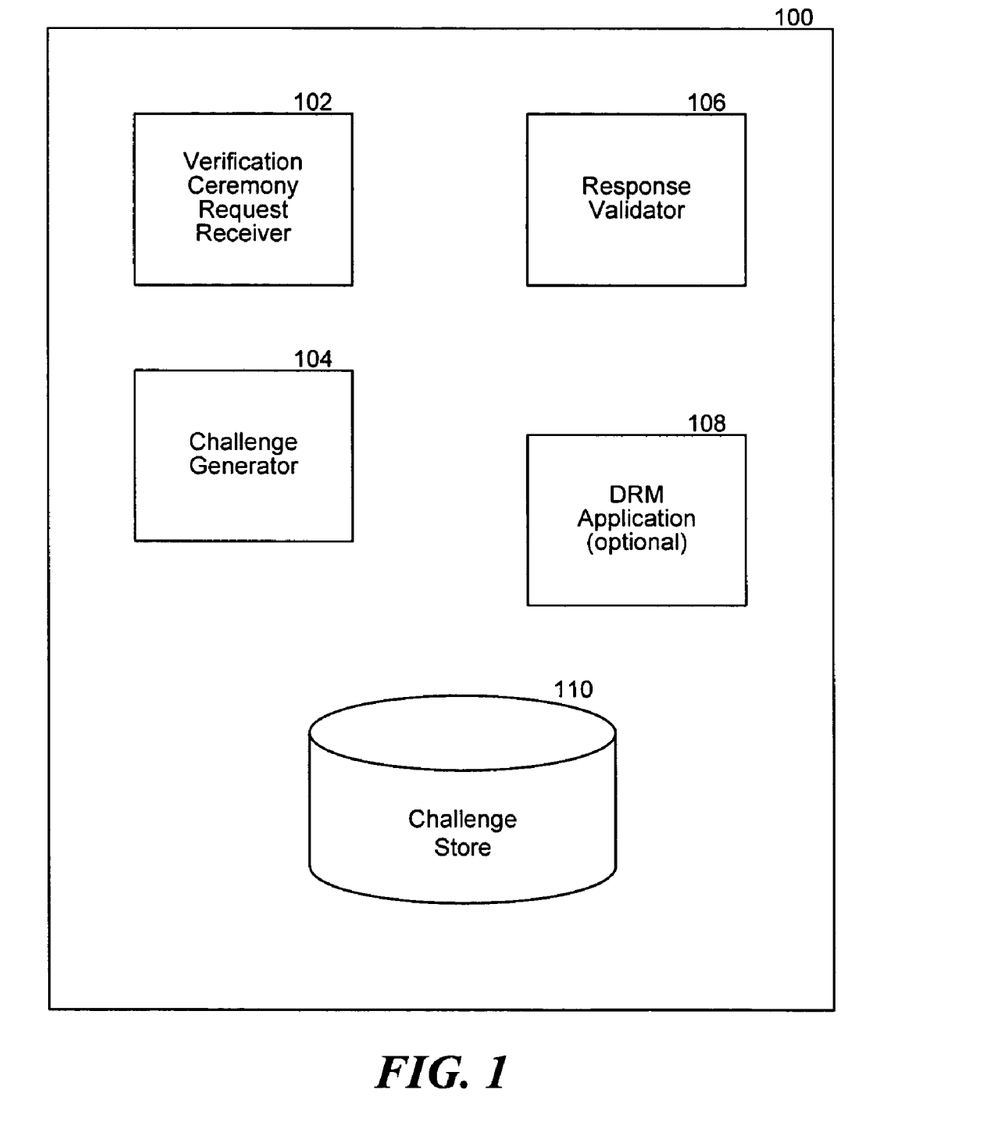
FIG. 1 is a high-level block diagram that illustrates selected components of a facility for performing a local human verification ceremony, according to some embodiments.

FIG. 1 is a high-level block diagram that illustrates selected components of a facility 100 for performing a local human verification ceremony, according to some embodiments. The facility comprises a verification ceremony request receiver 102, a challenge generator 104, a response validator 106, an optional DRM application 108, and a challenge store 110. The verification ceremony request receiver receives a request to perform a local human verification ceremony. The local human verification ceremony is to obtain verification from a user that the user wants to perform an action on the computer system. The challenge generator generates a CAPTCHA challenge that describes the action for which user verification is being sought, and which requests that the user verifies or authorizes the action to be performed. In some embodiments, the challenge generator displays the CAPTCHA challenge in a verification window. In some embodiments, the challenge generator displays the CAPTCHA challenge in a DRM protected window. The response validator receives a response to the CAPTCHA challenge from the user and compares the response to a correct response (i.e., an expected response). If the response is correct, the response validator authorizes the action to be performed. Otherwise, if the response is incorrect, the response validator does not authorize the action to be performed. The DRM application is an application that incorporates or supports the DRM technology, and which is capable of generating a DRM protected window. For example, a process may specify access rights to attach to a DRM protected window and request that the DRM application generate a DRM protected window having the specified access rights. The process may then display contents in the DRM protected window, and have the displayed contents protected by the access rights associated with the DRM protected window. The challenge store is a data store that contains the CAPTCHA challenges. In some embodiments, the challenge store may contain a predetermined number of X (e.g., 5, 10, 15, etc.) challenges which are used in sequence by the challenge generator. The challenges in the challenge store may periodically be replaced, replenished, changed, etc. For example, the facility may obtain a new set of challenges from a remote server once every month.

The computing device on which the facility is implemented may include a central processing unit, memory, input devices (e.g., keyboard and pointing devices), output devices (e.g., display devices), and storage devices (e.g., disk drives). The memory and storage devices are computer-readable media that may contain instructions that implement the facility. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the facility may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The facility may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
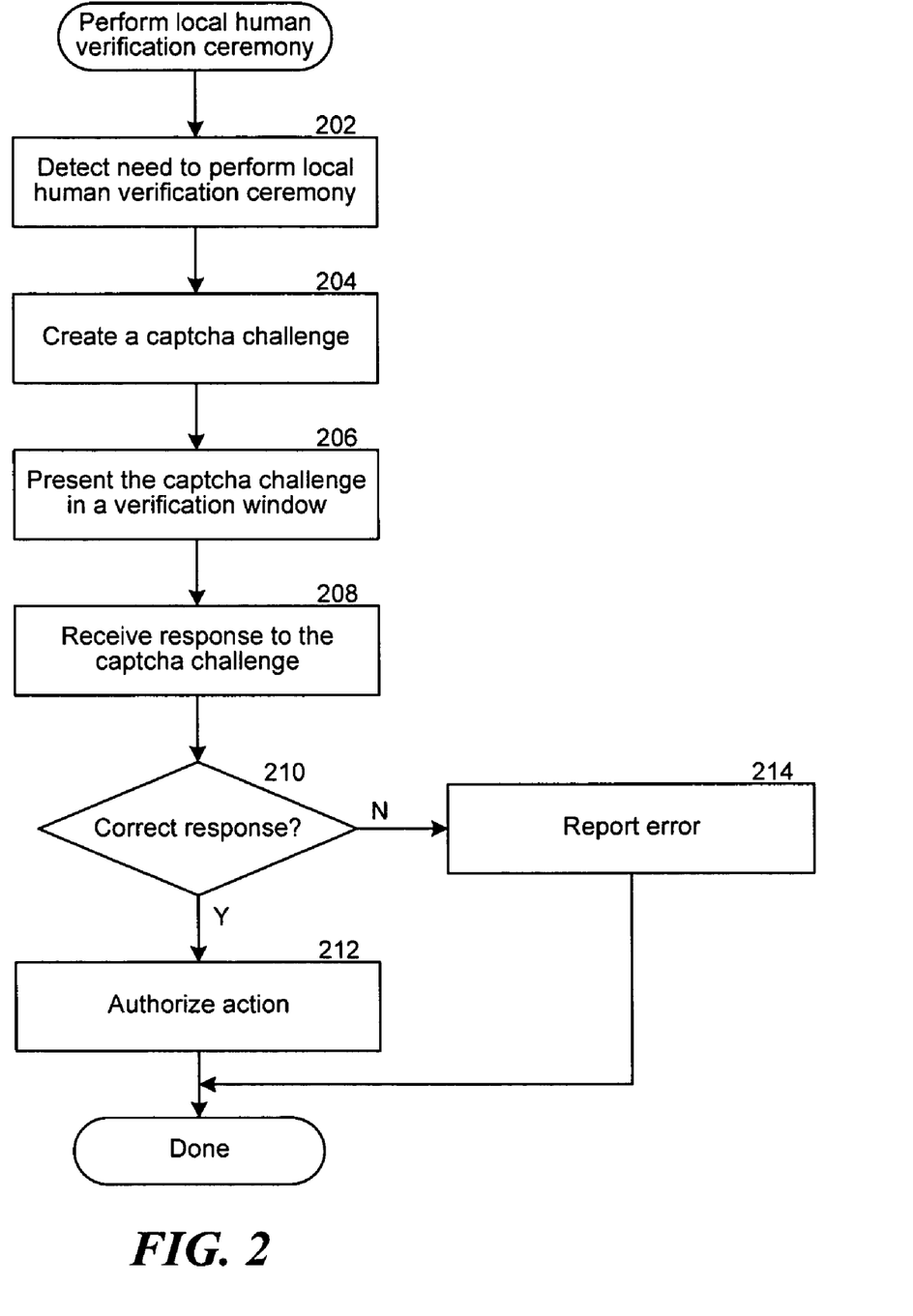
FIG. 2 is a flow diagram illustrating the performing of a local human verification ceremony by presenting a CAPTCHA challenge, according to some embodiments.

FIG. 2 is a flow diagram illustrating the performing of a local human verification ceremony by presenting a CAPTCHA challenge, according to some embodiments. In block 202, the verification ceremony request receiver detects a need to perform a local human verification ceremony. For example, a process, such as an operating system, executing on a computer system may have requested to perform a local human verification ceremony to obtain verification from a user that the user wants to perform an action on the computer system. In block 204, the challenge generator creates a CAPTCHA challenge that requests authorization to perform the action. In block 206, the challenge generator presents the CAPTCHA challenge in a verification window. In block 208, the response validator receives a response to the presented CAPTCHA challenge and, in block 210, checks to determine if the received response is a correct response. If the received response is the correct response, then, in block 212, the response validator authorizes the action to be performed. For example, the response validator may return to the calling process (i.e., the process that requested the local human verification ceremony) a return code that indicates to the calling process that the user verified the action. Otherwise, if the received response is not the correct response, then, in block 214, the response validator reports the error condition. In this instance, the performance of the action is not verified (or authorized) by the user. In some embodiments, the CAPTCHA challenge requests that the user provide the correct response within a predetermined amount of time in order to verify the performance of the action.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 3:
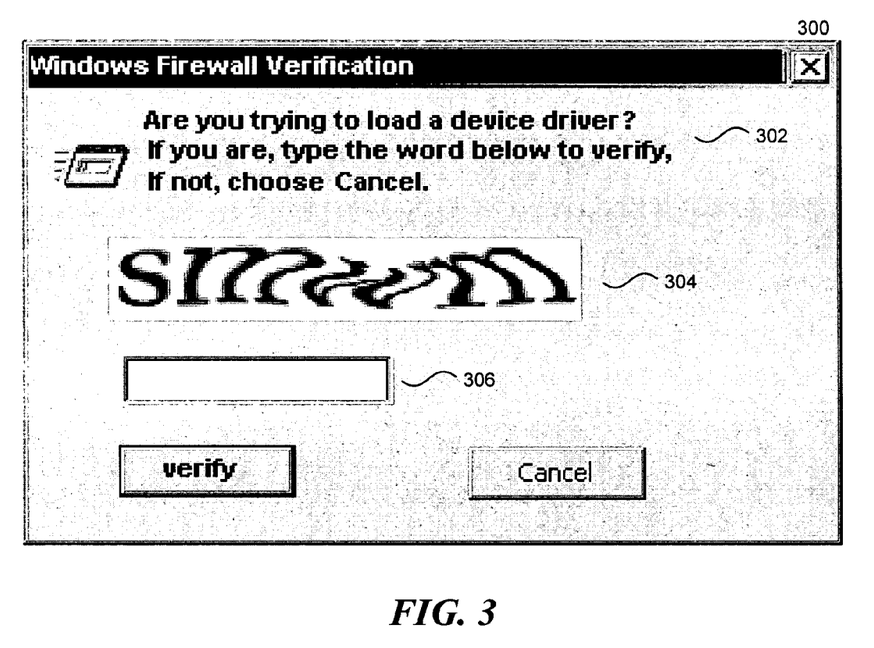
FIG. 3 is a display diagram showing an example verification window containing a CAPTCHA challenge, according to some embodiments.

FIG. 3 is a display diagram showing an example verification window 300 containing a CAPTCHA challenge, according to some embodiments. The CAPTCHA challenge contains accompanying text 302, an image 304, and an input-text-box 306. The substance of the accompanying text describes to the user the action that the user is being asked to verify. The substance of the accompanying text may also provide the user instructions on how to respond to the CAPTCHA challenge. The image is a distorted image of text (e.g., text that is written in wavy font). The input-text-box provides a location for the user to enter a response to the CAPTCHA challenge. The verification window may also contain a "verify" button and a "cancel" button, as depicted by way of example in FIG. 3, which can be used to by the user to request verification of the provided response or cancellation of the action, respectively.

Figure 4:
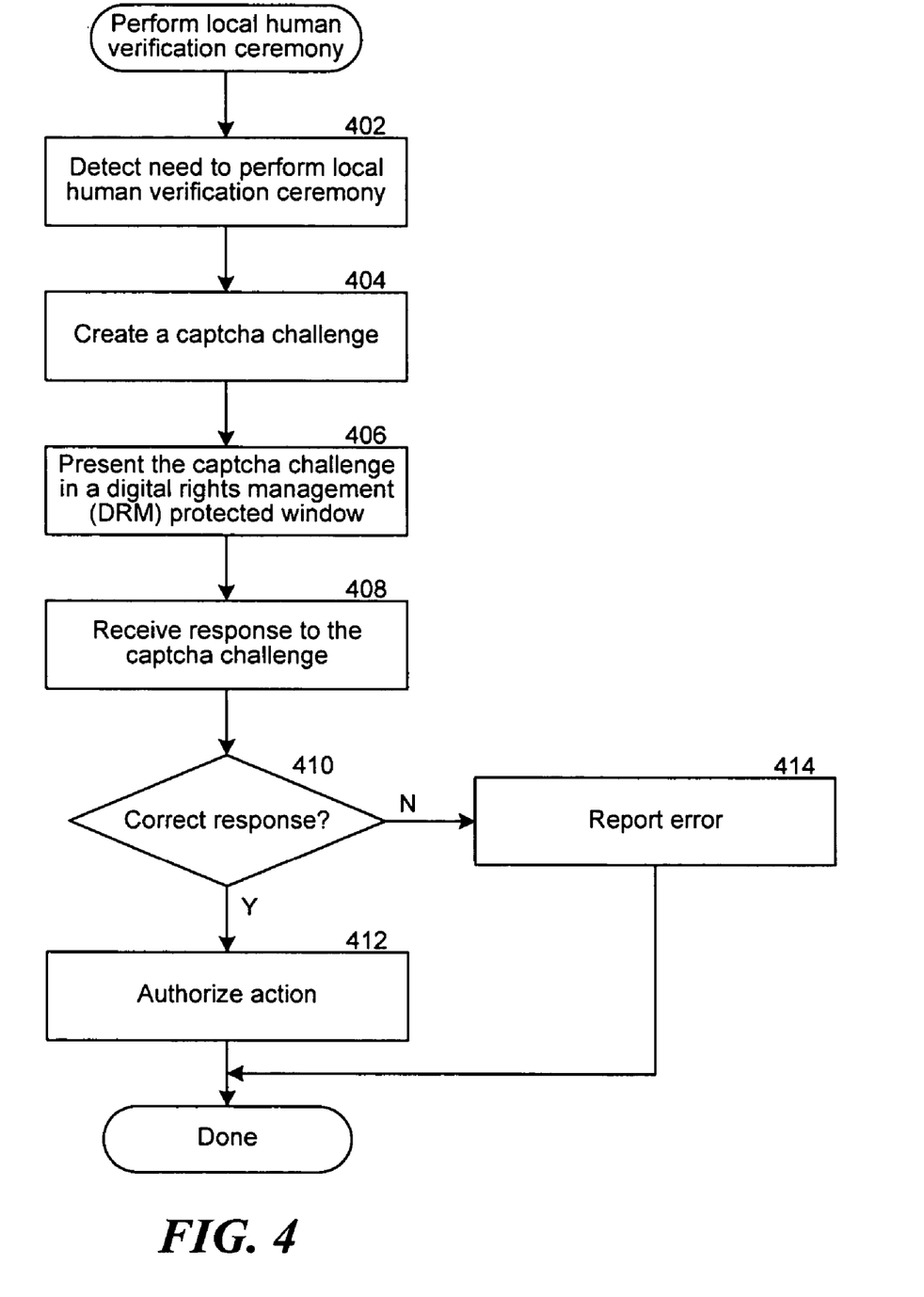
FIG. 4 is a flow diagram illustrating the performing of a local human verification ceremony by presenting a CAPTCHA challenge in a digital rights management (DRM) protected window, according to some embodiments.

FIG. 4 is a flow diagram illustrating the performing of a local human verification ceremony by presenting a CAPTCHA challenge in a digital rights management (DRM) protected window, according to some embodiments. In block 402, the verification ceremony request receiver detects a need to perform a local human verification ceremony. For example, an application process executing on a computer system may have requested to perform a local human verification ceremony to obtain verification from a user that the user wants to perform an action on the computer system. In block 404, the challenge generator creates a CAPTCHA challenge that requests authorization to perform the action. In block 406, the challenge generator presents the CAPTCHA challenge in a DRM protected window. The challenge generator may have obtained the DRM protected window from the DRM application. In block 408, the response validator receives a response to the presented CAPTCHA challenge and, in block 410, checks to determine if the received response is a correct response. If the received response is the correct response, then, in block 412, the response validator authorizes the action to be performed. Otherwise, if the received response is not the correct response, then, in block 414, the response validator reports the error condition.

Figure 5:
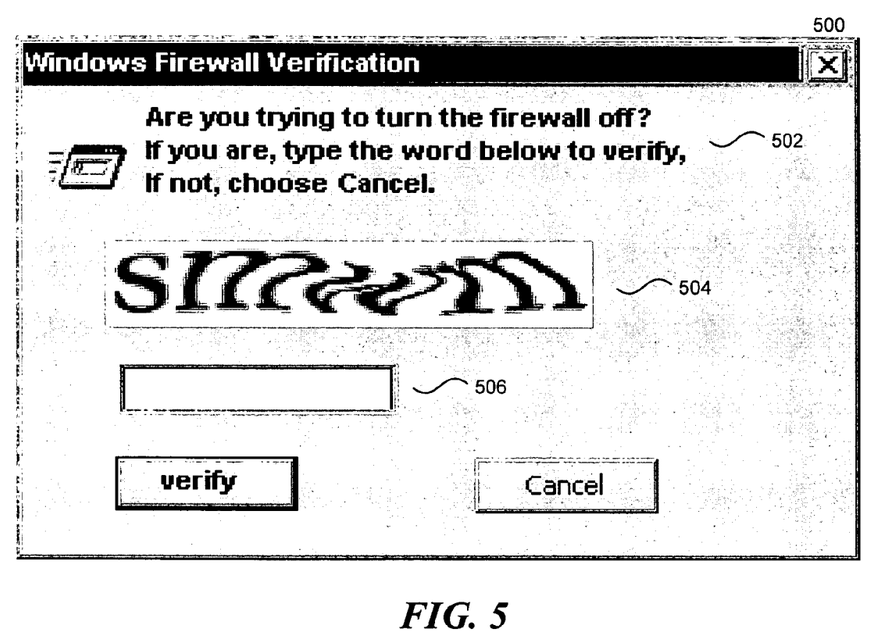
FIG. 5 is a display diagram showing an example digital rights management (DRM) protected window containing a CAPTCHA challenge, according to some embodiments.

FIG. 5 is a display diagram showing an example digital rights management (DRM) protected window 500 containing a CAPTCHA challenge, according to some embodiments. The DRM protected window can be assigned access rights that cause the CAPTCHA challenge to not exist outside of the DRM protected window. The CAPTCHA challenge contains accompanying text 502, an image 504, and an input-text-box 506. The substance of the accompanying text describes to the user the action that the user is being asked to verify. The substance of the accompanying text may also provide the user instructions on how to respond to the CAPTCHA challenge. The image is a distorted image of text (e.g., text that is written in wavy font). The input-text-box provides a location for the user to enter a response to the CAPTCHA challenge. Similar to the verification window of FIG. 3, the DRM protected window may also contain a "verify" button and a "cancel" button.

Figure 6:
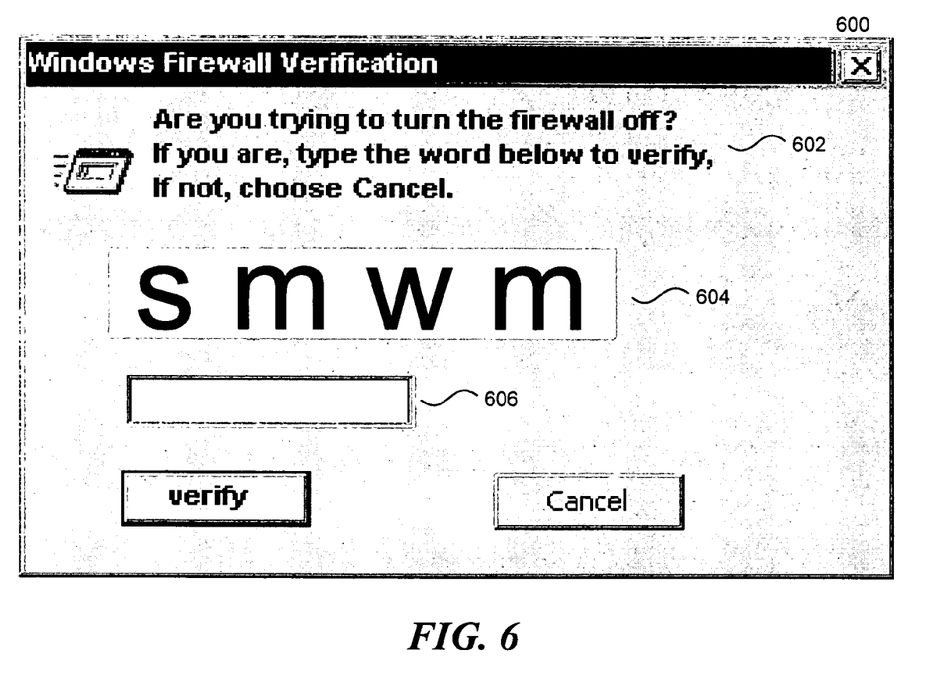
FIG. 6 is a display diagram showing an example digital rights management (DRM) protected window containing a plain text CAPTCHA challenge, according to some embodiments.

FIG. 6 is a display diagram showing an example digital rights management (DRM) protected window 600 containing a plain text CAPTCHA challenge, according to some embodiments. The CAPTCHA challenge contains accompanying text 602, an image 604, and an input-text-box 606. The substance of the accompanying text describes to the user the action that the user is being asked to verify. The substance of the accompanying text may also provide the user instructions on how to respond to the CAPTCHA challenge. The image is an image of plain text. The input-text-box provides a location for the user to enter a response to the CAPTCHA challenge. Similar to the verification window of FIG. 3, the DRM protected window may also contain a "verify" button and a "cancel" button.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method in a computer system with a processor and a memory for performing a local human verification ceremony, the method comprising:
   identifying an action to be performed on the computer system, the action being requested by possible malware executing on the computer system;
   indicating that the local human verification ceremony needs to be performed before the identified action is performed, the local human verification ceremony requesting user verification to perform the identified action on the computer system;
   creating a verification window that is digital rights management protected so that content of the verification window can be viewed, but cannot be copied or forwarded;
   presenting to a user for viewing a CAPTCHA challenge as content of the verification window, wherein the CAPTCHA challenge displays an image of distorted text, further wherein the CAPTCHA challenge requests that the distorted text be entered in a response input-text-box;
   upon receiving a request to copy or forward content of the verification window, suppressing the copying or forwarding of the verification window;
   receiving from the user text input into the input-text-box;
   determining by the computer system whether the text matches the distorted text; and
   when it is determined that the received text does not match the distorted text, suppressing the performing of the identified action; and
   when it is determined that the received text matches the distorted text, performing by the computer system the identified action.

2. The method of claim 1, wherein the CAPTCHA challenge requests that the distorted text be entered in the response input-text-box within a predetermined timeout.

3. The method of claim 1, wherein the CAPTCHA challenge is obtained from a remote server.

4. The method of claim 1, wherein the CAPTCHA challenge is one of a plurality of CAPTCHA challenges that are maintained on the computer system.

5. The method of claim 1, wherein the identified action is being performed by an operating system on the computer system.

6. A computer-readable storage device whose contents cause a computer system to perform a local human verification ceremony, by a method comprising:
   receiving from a process executing on the computer system a request to perform an action;
   determining that the local human verification ceremony needs to be performed before the action is performed because the action is being requested by possible malware, the local human verification ceremony requesting user verification to perform the action on the computer system;
   presenting to a user for user viewing a CAPTCHA challenge in a digital rights management (DRM) protected window to prevent copying of the CAPTCHA challenge, wherein the CAPTCHA challenge displays an image of an alpha-numeric string, further wherein the CAPTCHA challenge requests that the displayed alpha-numeric string be entered in a response input-text-box;
   receiving from the user content input into the input-text-box;
   determining by the computer system whether the received content matches the alpha-numeric string;
   when the received content does not match the alpha-numeric string, suppressing the performing of the action; and
   when the received content matches the alpha-numeric string, performing by the computer system the action
   wherein the human verification ceremony is performed locally on the computer system that executes the process that requests to perform the action and the action is performed locally on the computer system.

7. The computer-readable storage device of claim 6, wherein the display of the image of the alpha-numeric string is distorted.

8. The computer-readable storage device of claim 6, wherein the alpha-numeric string contains at least one numeric character.

9. The computer-readable storage device of claim 6, wherein the alpha-numeric string contains at least one text character.

10. The computer-readable storage device of claim 6, wherein the CAPTCHA challenge is one of a plurality of CAPTCHA challenges that are maintained on the computer system.

11. The computer-readable storage device of claim 6, wherein the CAPTCHA challenge is one of a plurality of CAPTCHA challenges that are maintained on the computer system.

12. The computer-readable storage device of claim 6, wherein the action is be performed by an operating system on the computer system.

13. The computer-readable storage device of claim 6, wherein the action is to install an application on the computer system.

14. The computer-readable storage device of claim 6, wherein the action is to alter a security configuration on the computer system.

15. The computer-readable storage device of claim 6, wherein the action is to alter a system configuration setting on the computer system.

16. The computer-readable storage device of claim 6, wherein the authorization is provided if the matching response is received within a predetermined timeout.

17. A computer system for performing a local human verification ceremony locally on the computer system that executes a process that requests to perform an action and for performing the action locally on the computer system, the system comprising:

a memory storing computer-executable instructions of:

a component configured to receive from the process executing on the computer system a request to perform the action;

a component configured to determine that the local human verification ceremony needs to be performed before the action is performed because the action is requested by possible malware executing on the computer system, wherein the local human verification ceremony requests user verification to perform the action on the computer system;

a component that creates a verification window that is digital rights management protected so that content of the verification window can be viewed, but cannot be copied;

a component configured to present a CAPTCHA challenge as content of the verification window, wherein the CAPTCHA challenge displays an image of distorted text, further wherein the CAPTCHA challenge requests that the distorted text be entered in a response input-text-box;

a component that prevents the copying of content of the verification window;

a component configured to receive a response to the CAPTCHA challenge, the component also configured to provide authorization to perform the action at the computer system upon determining by the computer system that the received response matches the displayed distorted text and to suppress the providing of authorization to perform the action upon determining that the received response does not match the displayed distorted text; and a processor executing the computer-executable instructions stored in the memory.

\* \* \* \* \*

UNITED STATES PATENT AND TRADEMARK OFFICE
CERTIFICATE OF CORRECTION

| | | |
|---|---|---|
| PATENT NO. | : 8,145,914 B2 | Page 1 of 1 |
| APPLICATION NO. | : 11/303441 | |
| DATED | : March 27, 2012 | |
| INVENTOR(S) | : Steeves | |

It is certified that error appears in the above-identified patent and that said Letters Patent is hereby corrected as shown below:

In the Claims:

In column 7, line 66, in Claim 5, delete "being" and insert -- to be --, therefor.

In column 8, lines 44-46, in Claim 10, delete "one of a plurality of CAPTCHA challenges that are maintained on the computer system." and insert -- obtained from a remote server. --, therefor.

In column 8, line 52, in Claim 12, after "is" insert -- to --.

In column 9, line 2, in Claim 17, after "system, the" insert -- computer --.

Signed and Sealed this
Thirtieth Day of April, 2013

Teresa Stanek Rea
*Acting Director of the United States Patent and Trademark Office*